United States Patent
Yoshimura et al.

(10) Patent No.: US 11,343,367 B2
(45) Date of Patent: May 24, 2022

(54) RADIO COMMUNICATION APPARATUS AND METHOD WITH SWITCH FOR INTERNAL/EXTERNAL SPEAKER-MICROPHONE MECHANISM USED IN RADIO AND PTT COMMUNICATIONS

(71) Applicant: JVCKENWOOD CORPORATION, Yokohama (JP)

(72) Inventors: Motoshi Yoshimura, Yokohama (JP); Seiji Okada, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/160,163

(22) Filed: Jan. 27, 2021

(65) Prior Publication Data
US 2021/0289065 A1 Sep. 16, 2021

(30) Foreign Application Priority Data
Mar. 10, 2020 (JP) .............................. JP2020-040704

(51) Int. Cl.
*H04M 1/60* (2006.01)
*H04W 4/10* (2009.01)

(52) U.S. Cl.
CPC .......... *H04M 1/6041* (2013.01); *H04W 4/10* (2013.01)

(58) Field of Classification Search
CPC .. H04M 1/6041; H04M 1/605; H04M 1/6066; H04M 1/6075; H04M 1/6083; H04M 1/6091; H04M 1/6033; H04M 1/60; H04M 4/18; H04M 4/19; H04M 4/10
See application file for complete search history.

(56) References Cited

U.S. PATENT DOCUMENTS

2005/0079885 A1\* 4/2005 Patino ................. H04M 1/6066 455/518
2020/0264832 A1\* 8/2020 Kobayashi ........... H04R 1/1041

FOREIGN PATENT DOCUMENTS

JP 2014-068066 A 4/2014

\* cited by examiner

*Primary Examiner* — Ankur Jain
*Assistant Examiner* — Angelica M Perez
(74) *Attorney, Agent, or Firm* — Procopio, Cory, Hargreaves & Savitch LLP

(57) ABSTRACT

A radio communication apparatus includes a transceiver circuit, an internal speaker, an internal microphone, an external connection terminal, a connection detection circuit, a drive setting circuit, and a disconnection detection circuit. The transceiver circuit transmits and receives a transmission audio signal and a reception audio signal. The connection detection circuit detects a connection between the external speaker-microphone and the external connection terminal. The drive setting circuit drives the internal speaker and the internal microphone when the connection is not detected, and drives the external speaker-microphone when the connection is detected. The disconnection detection circuit detects a disconnection in an audio signal line for the external speaker. Further, when the disconnection is detected, the drive setting circuit makes the internal speaker output a sound represented by a reception audio signal.

4 Claims, 10 Drawing Sheets

RADIO COMMUNICATION APPARATUS AND METHOD WITH SWITCH FOR INTERNAL/EXTERNAL SPEAKER-MICROPHONE MECHANISM USED IN RADIO AND PTT COMMUNICATIONS

CROSS REFERENCE TO RELATED APPLICATION

This application is based upon and claims the benefit of priority from Japanese patent application No. 2020-040704, filed on Mar. 10, 2020, the disclosure of which is incorporated herein in its entirety by reference.

BACKGROUND

The present disclosure relates to a radio communication apparatus, a control method, and a control program.

Electronic equipment such as a radio communication apparatus includes an internal speaker and an internal microphone, and is also equipped with connection terminals for connecting an external speaker and an external microphone through cables. Such electronic equipment is configured so that when the external speaker and the external microphone are connected, the internal speaker and the internal microphone are automatically disabled. For such electronic equipment, a technique for detecting that there is a disconnection (e.g., a broken wire or the like) in the connected external speaker or the connected external microphone has been developed.

For example, Japanese Unexamined Patent Application Publication No. 2014-068066 discloses electronic equipment including a disconnection detection circuit for a device such as an earphone(s) in which a signal output unit and a microphone are disposed close to each other. The electronic equipment sends a first test signal having a predetermined pattern to the aforementioned signal output unit. Next, the electronic equipment receives a signal that is generated as the aforementioned signal is picked up by the microphone and returned to the electronic equipment, and compares the received signal with a first reference signal having the same pattern as that of the first test signal. Further, the above-described electronic equipment determines whether or not the first test signal returns to the electronic equipment, and thereby detects whether there is a disconnection in the signal output unit or the microphone. Further, when the electronic equipment detects a disconnection, it displays a message for notifying a user or the like of the disconnection in a display unit.

SUMMARY

However, in the above-described electronic equipment, the user or the like cannot recognize that a disconnection has occurred unless he/she looks at the display unit. Further, when there is a disconnection in the above-described electronic equipment, it is impossible to continue communication unless the device in which there is the disconnection is disconnected from the electronic equipment.

A radio communication apparatus according to an embodiment includes a transceiver circuit, an internal speaker, an internal microphone, an external connection terminal, a connection detection circuit, a drive setting circuit, and a disconnection detection circuit. The transceiver circuit is configured to transmit a transmission audio signal and receive a reception audio signal in radio communication. The external connection terminal is configured so that an external speaker-microphone including an external speaker and an external microphone is connected thereto and can be driven therethrough. The connection detection circuit is configured to detect a connection between the external speaker-microphone and the external connection terminal. The drive setting circuit is configured to drive the internal speaker and the internal microphone when the connection detection circuit does not detect a connection, and drive the external speaker-microphone instead of driving the internal speaker and the internal microphone when the connection detection circuit detects the connection. The disconnection detection circuit is configured to detect a disconnection in an audio signal line for or in the external speaker included in the connected external speaker-microphone. Further, when the disconnection detection circuit detects the disconnection, the drive setting circuit makes a setting so that a sound represented by a reception audio signal is output from the internal speaker instead of being output from the external speaker.

A control method according to an embodiment is a control method for a radio communication apparatus including an internal speaker, an internal microphone, a PTT (Push-to-Talk) switch, and a connection terminal configured so that an external speaker-microphone including an external speaker and an external microphone is connected thereto and can be driven therethrough. The control method includes a connection detection step, an external device driving step, a disconnection detection step, and a drive setting step. In the connection detection step, a connection between the external speaker-microphone and the connection terminal is detected. In the external device driving step, when the connection is detected, the external speaker-microphone is driven instead of the internal speaker and the internal microphone. In the disconnection detection step, a disconnection in an audio signal line for or in the external speaker included in the connected external speaker-microphone is detected. Further, in the drive setting step, when the disconnection is detected, a setting is made so that a sound represented by a reception audio signal is output from the internal speaker instead of being output from the external speaker.

A control program according to an embodiment is a control program for a radio communication apparatus including an internal speaker, an internal microphone, a PTT (Push-to-Talk) switch, and a connection terminal configured so that an external speaker-microphone including an external speaker and an external microphone is connected thereto and can be driven therethrough. The control program is adapted to cause the radio communication apparatus to perform a connection detection step, an external device driving step, a disconnection detection step, and a drive setting step. In the connection detection step, a connection between the external speaker-microphone and the connection terminal is detected. In the external device driving step, when the connection is detected, the external speaker-microphone is driven instead of the internal speaker and the internal microphone. In the disconnection detection step, a disconnection in an audio signal line for or in the external speaker included in the connected external speaker-microphone is detected. Further, in the drive setting step, when the disconnection is detected, a setting is made so that a sound represented by a reception audio signal is output from the internal speaker instead of being output from the external speaker.

According to an embodiment, it is possible to provide a radio communication apparatus and the like capable of suitably continuing voice communication even when there is a disconnection in an audio signal line for or in a connected external speaker.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

The present disclosure will be explained hereinafter through embodiments according to the present disclosure. However, they are not intended to limit the scope of the invention according to the claims. Further, all the components/structures described in the embodiments are not necessarily indispensable as means for solving the problem. For clarifying the explanation, the following description and the drawings are partially omitted and simplified as appropriate. The same symbols are assigned to the same elements throughout the drawings and duplicated explanations are omitted as appropriate.

First Embodiment

Figure 1:
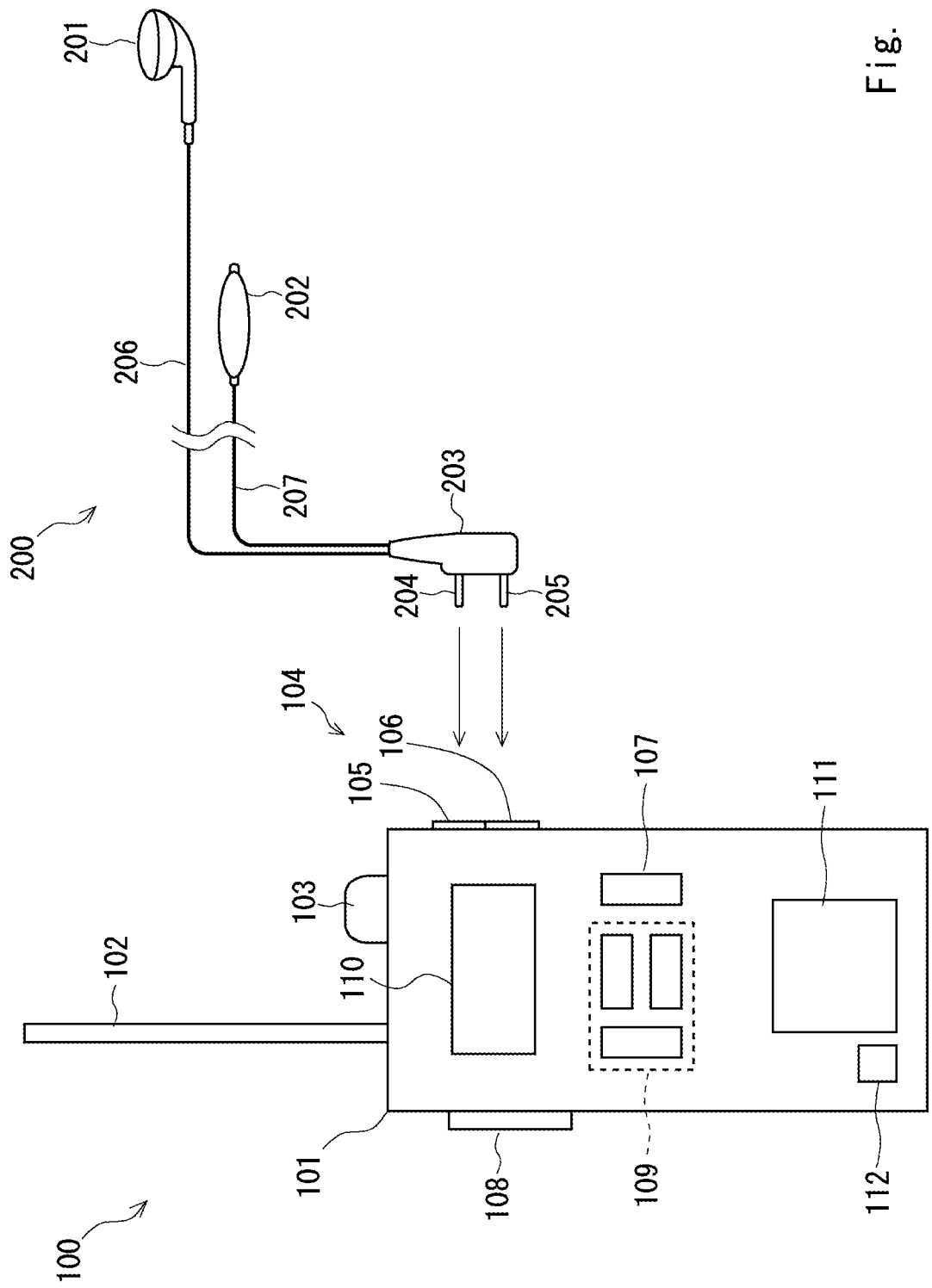
FIG. 1 is a schematic diagram of a radio communication apparatus and an external speaker-microphone according to a first embodiment.

A first embodiment will be described hereinafter with reference to the drawings. Firstly, a configuration of electronic equipment according to this embodiment will be described with reference to FIG. 1. FIG. 1 is a schematic diagram of a radio communication apparatus and an external speaker-microphone according to the first embodiment. A radio communication apparatus 100 according to the first embodiment is shown on the left side of FIG. 1, and an external speaker-microphone 200 connected to the radio communication apparatus 100 according to the first embodiment is shown on the right side of FIG. 1.

The radio communication apparatus 100 is an embodiment in the form of a radio communication apparatus. The radio communication apparatus 100 has functions as a transceiver which outputs, from a speaker, an audio signal received from an entity with which the transceiver communicates (hereinafter also referred to as an entity on the other end of communication) through radio communication, and picks up, from a microphone, a sound such as a user's talk and transmits the picked-up sound to the entity on the other end of the communication as a transmission signal. Note that the audio signal in the present disclosure includes not only signals representing human voices but also other signals in an audio-frequency band that can be transmitted by the radio communication apparatus 100, such as a tone signal for controlling the radio communication apparatus 100 and a confirmation sound used in communication.

The external speaker-microphone 200 is an external device configured to be able to be connected to the radio communication apparatus 100. The external speaker-microphone 200 includes an external speaker 201 and an external microphone 202. Note that details of the external speaker-microphone 200 will be described later.

A configuration of the radio communication apparatus 100 will be described hereinafter with reference to the schematic diagram of the radio communication apparatus 100. The radio communication apparatus 100 shown in FIG. 1 mainly includes a housing 101, an antenna 102, a volume adjustment unit 103, an external connection terminal 104, a power supply switch 107, a PTT (Push-to-Talk) switch 108, an operation unit 109, a display unit 110, an internal speaker 111, and an internal microphone 112.

The housing 101 is a container in which the components of the radio communication apparatus 100 are housed. The antenna 102 projecting from the housing 101 is an antenna that is used by the radio communication apparatus 100 to perform radio communication with an entity on the other end of communication, and is configured to be able to transmit and receive predetermined radio waves. The volume adjustment unit 103 is an adjusting knob for adjusting the volume of sounds output from the speaker, and is configured so that when the adjustment knob is rotated in one direction, the volume is increased, and when it is rotated in the other direction, the volume is decreased.

The external connection terminal 104 is an interface for selectively connecting the external speaker-microphone 200 to the radio communication apparatus 100. The external connection terminal 104 may be, for example, a commonly-used terminal such as a phone jack, a phone connector, or an AUX (auxiliary) terminal. The external connection terminal 104 includes a speaker connection terminal 105 and a microphone connection terminal 106.

The speaker connection terminal 105 is an interface for connecting the external speaker 201 to the radio communication apparatus 100 so that the external speaker 201 can be driven. The speaker connection terminal 105 has a shape for receiving a corresponding interface of the external speaker 201. In this embodiment, the speaker connection terminal 105 has a predetermined hole shape.

The microphone connection terminal 106 is an interface for connecting the external microphone 202 to the radio communication apparatus 100 so that the external microphone 202 can be driven. The microphone connection terminal 106 has a shape for receiving a corresponding interface of the external microphone 202. In this embodiment, the microphone connection terminal 106 has a predetermined hole shape. Note that the microphone connection terminal 106 may have a shape and/or a size different from those of the speaker connection terminal 105 in order to prevent the terminal of the external speaker from being mistakenly inserted thereinto.

The power supply switch 107 is a switch for turning on or off the power supply of the radio communication apparatus 100. The radio communication apparatus 100 starts up when, for example, the power supply switch 107 is pressed down, and shuts downs when the power supply switch 107 is pressed down again.

The PTT switch 108 is a button for implementing a push-to-talk (PTT: Push to Talk) function. The push-to-talk function is a function by which the radio communication apparatus 100 enters a state (a transmitting state) in which an audio signal of a sound picked up by the microphone is transmitted while the button is being pressed down (an On-state), and enters a state (a receiving state) in which no transmission is performed and an audio signal is received from the entity on the other end of the communication while the button is not pressed down (an Off-state). When a user desires to transmit his/her talk, he/she presses down the PTT switch 108, talks while continuing to press down the PTT switch 108, and releases the PTT switch 108 after finishing the talk. That is, the radio communication apparatus 100 according to this embodiment performs communication according to a simplex communication technique.

The operation unit 109 includes a plurality of buttons and receives predetermined operations in the radio communication apparatus 100, such as switching of channels and switching of other operation modes. The display unit 110 is a display unit for displaying various types of information to be shown to the user, and includes, for example, a liquid crystal panel.

The internal speaker 111 outputs an audio signal received from the entity on the other end of the communication as a sound. The internal microphone 112 picks up a sound around the radio communication apparatus 100 such as user's talk, and generates an audio signal from the picked-up sound.

Next, the external speaker-microphone 200 will be described with reference to FIG. 1. The external speaker-microphone 200 mainly includes the external speaker 201, the external microphone 202, an external terminal unit 203, a speaker cable 206 and a microphone cable 207.

When the external speaker-microphone 200 is connected to the radio communication apparatus 100, the external speaker 201 outputs a received audio signal as a sound. The external speaker 201 is connected to the external terminal unit 203 through the speaker cable 206. The external speaker 201 may be an earphone(s) or a headphone(s).

The external microphone 202 is a microphone. When the external speaker-microphone 200 is connected to the radio communication apparatus 100, the external microphone 202 picks up a sound around it and thereby generates an audio signal to be transmitted to the entity on the other end of the communication. The external microphone 202 is connected to the external terminal unit 203 through the microphone cable 207.

The external terminal unit 203 is an interface for connecting the external speaker-microphone 200 to the radio communication apparatus 100, and includes a speaker plug 204 and a microphone plug 205. Note that, in the external terminal unit 203, the speaker plug 204 and the microphone plug 205 do not necessarily have to be integrated with each other. That is, each of the speaker plug 204 and the microphone plug 205 may be formed as a separate external terminal unit. The speaker plug 204 is connected to the external speaker 201 through the speaker cable 206. The speaker plug 204 has a projecting shape, and is engaged into and brought into electrical contact with the speaker connection terminal 105. The microphone plug 205 is connected to the external microphone 202 through the microphone cable 207. The microphone plug 205 has a projecting shape, and is engaged into and brought into electrical contact with the microphone connection terminal 106. In the state where the external terminal unit 203 is connected to the external connection terminal 104 of the radio communication apparatus 100, the speaker connection terminal 105 and the speaker plug 204 are in electrical contact with each other, and the microphone connection terminal 106 and the microphone plug 205 are in electrical contact with each other.

Figure 2:
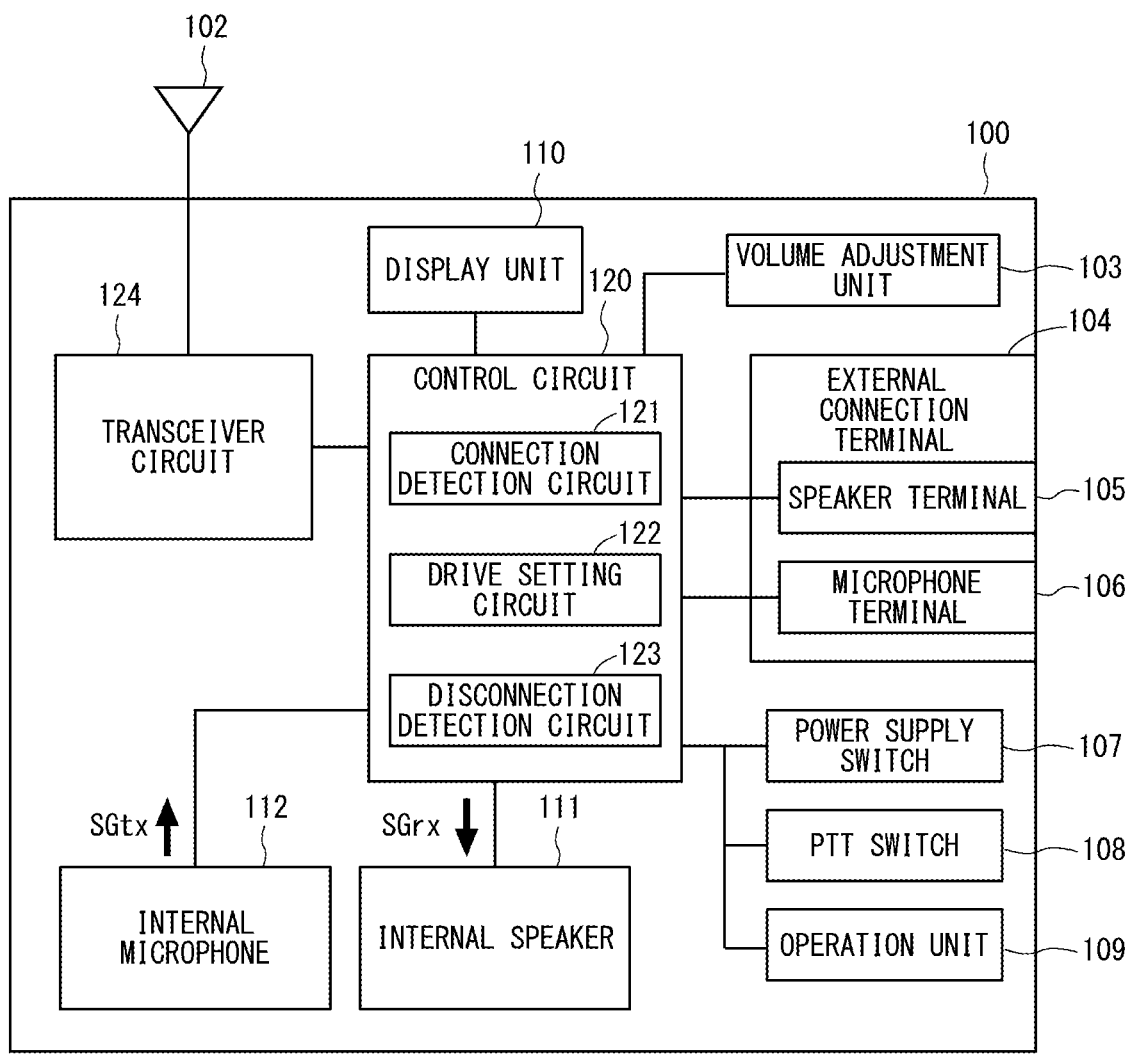
FIG. 2 is a block diagram of the radio communication apparatus according to the first embodiment.

Next, the radio communication apparatus 100 will be further described with reference to FIG. 2. FIG. 2 is a block diagram of the radio communication apparatus 100 according to the first embodiment. The radio communication apparatus 100 shown in FIG. 2 mainly includes the antenna 102, the volume adjustment unit 103, the external connection terminal 104, the internal speaker 111, the internal microphone 112, a control circuit 120, and a transceiver circuit 124. Further, the radio communication apparatus 100 also includes the display unit 110, the power supply switch 107, the PTT switch 108, and the operation unit 109.

The antenna 102 is connected to the transceiver circuit 124. When the antenna 102 receives an audio signal to be transmitted from the transceiver circuit 124, it transmits the received audio signal as radio waves. Further, the antenna 102 receives radio waves in a predetermined frequency band and supplies the received signal to the transceiver circuit 124. The signal transmitted from the entity on the other end of the communication is adapted so that the antenna 102 can receive it.

The volume adjustment unit 103 includes, for example, a circuit including a variable resistor, and its resistance value is changed by an operation performed by the user. The volume adjustment unit 103 is connected to the control circuit 120, and supplies the state of the resistance value changed by the operation by the user to the control circuit 120.

The external speaker-microphone 200 including the external speaker 201 and the external microphone 202 is connected to the external connection terminal 104 so that the external speaker-microphone 200 can be driven. As described above, the external connection terminal 104 includes the speaker connection terminal 105 and the microphone connection terminal 106. The speaker connection terminal 105 is connected to the control circuit 120. When the external speaker 201 is connected to the speaker connection terminal 105, the speaker connection terminal 105 supplies an audio signal to the connected external speaker 201. The microphone connection terminal 106 is connected to the control circuit 120. When the external microphone 202 is connected to the microphone connection terminal 106, the microphone connection terminal 106 supplies an audio signal generated by the external microphone 202 to the control circuit 120.

The internal speaker 111 is connected to the control circuit 120. When the internal speaker 111 receives an audio signal from the control circuit 120, the internal speaker 111 converts the received audio signal into a sound and outputs the generated sound. In FIG. 2, a reception audio signal SGrx that is supplied from the control circuit 120 to the internal speaker 111 is indicated by an arrow.

The internal microphone 112 is connected to the control circuit 120 and supplies an audio signal generated by the internal microphone 112 to the control circuit 120. In FIG.

2, a transmission audio signal SGtx supplied from the internal microphone 112 to the control circuit 120 is indicated by an arrow.

The control circuit 120 is composed of, for example, an arithmetic circuit referred to as a CPU (Central Processing Unit) or an MCU (Micro Controller Unit), a volatile or nonvolatile memory, and other circuits. Further, the control circuit 120 may be one that executes a predetermined program. The control circuit 120 may be one that implements predetermined functions by a combination of hardware and software.

The control circuit 120 is connected to each of the components included in the radio communication apparatus 100, and receives signals from these components as appropriate and performs processing for driving each of components that can be driven. For example, the control circuit 120 is connected to the volume adjustment unit 103 and controls the output of the speaker that is configured to be able to be driven (i.e., the internal speaker 111 or the external speaker 201) according to the state of the volume adjustment unit 103. Further, for example, the control circuit 120 is connected to the power supply switch 107 and controls the radio communication apparatus 100 into either an On-state or an Off-state according to the state of the power supply switch 107.

Further, the control circuit 120 is connected to the PTT switch 108, and controls the driving state of the microphone that is configured to be able to be driven (i.e., the internal microphone 112 or the external microphone 202) according to the state of the PTT switch 108. That is, when the PTT switch 108 is in an On-state, the control circuit 120 drives the microphone that is configured to be able to be driven and thereby makes that microphone generate a transmission audio signal SGtx. Further, when the PTT switch 108 is in an Off-state, the control circuit 120 stops the driving of the microphone configured to be able to be driven. Further, when a reception audio signal SGrx is received, the control circuit 120 drives the speaker and thereby outputs the reception audio signal SGrx from the speaker.

Further, the control circuit 120 is connected to the operation unit 109, receives various types of operations performed by the user, and performs processing according to the received operations. Further, the control circuit 120 is connected to the display unit 110 and instructs the display unit 110 to display various types of images. Further, the control circuit 120 mainly includes a connection detection circuit 121, a drive setting circuit 122, and a disconnection detection circuit 123.

The connection detection circuit 121 detects a connection between the external speaker-microphone 200 and the external connection terminal 104. As an example of the method by which the connection detection circuit 121 detects a connection, the connection detection circuit 121 may monitor a change in the potential of a signal line connected to the external connection terminal 104. Note that there are various types of conceivable methods as a specific method for detecting a connection between the external speaker-microphone 200 and the external connection terminal 104 as described above, and they are already well known to those skilled in the art. Therefore, detailed descriptions of them are omitted here.

The drive setting circuit 122 sets the speaker for outputting the reception audio signal SGrx, i.e., the speaker to be driven, according to the connection situation of the external speaker-microphone 200 and according to whether or not there is a disconnection (e.g., a broken wire or the like) in the audio signal line for or in the connected external speaker 201. Further, the drive setting circuit 122 sets the microphone for generating a transmission audio signal, i.e., the microphone to be driven, according to the connection situation of the external speaker-microphone 200, whether or not there is a disconnection in the audio signal line for or in the connected external speaker 201, and the communication situation of the radio communication apparatus 100.

For example, when the connection detection circuit 121 has not detected a connection with the external speaker-microphone 200, the drive setting circuit 122 drives the internal speaker 111 and the internal microphone 112. Further, when the connection detection circuit 121 has detected a connection with the external speaker-microphone 200, the drive setting circuit 122 drives the external speaker-microphone 200 instead of driving the internal speaker 111 and the internal microphone 112. Further, when the disconnection detection circuit 123 detects a disconnection (e.g., a broken wire or the like), the drive setting circuit 122 drives the internal speaker 111 instead of driving the external speaker.

Note that the radio communication apparatus 100 shown in FIGS. 1 and 2 is not connected to the external speaker-microphone 200. Therefore, the connection detection circuit 121 does not detect a connection with the external speaker-microphone 200. Therefore, in this case, the drive setting circuit 122 makes a setting so that the internal speaker 111 and the internal microphone 112 are driven.

The disconnection detection circuit 123 detects a disconnection in the audio signal line for or in the external speaker 201 included in the connected external speaker-microphone 200. As an example of a specific method for detecting such a disconnection, the disconnection detection circuit 123 may employ a method in which it extracts a DC (Direct Current) component of the external speaker 201 from a signal line for or in the connected external speaker 201 and monitors a change in the potential of the extracted DC component. Further, as other examples of specific methods for detecting such a disconnection, the disconnection detection circuit 123 may employ methods other than the above-described method.

The transceiver circuit 124 is connected to the antenna 102 and the control circuit 120, and transmits a transmission audio signal SGtx received from the control circuit 120 to the entity on the other end of the communication through the antenna 102. Further, when the transceiver circuit 124 receives a reception audio signal SGrx from the entity on the other end of the communication through the connected antenna 102, it supplies the received reception audio signal SGrx to the control circuit 120.

The display unit 110 is connected to the control circuit 120 and displays various types of information according to instructions from the control circuit 120. The display unit 110 may display, for example, information indicating that the external speaker-microphone 200 is connected to the radio communication apparatus 100. Further, the display unit 110 may display information indicating that there is a disconnection in the audio signal line for or in the connected external speaker 201.

The power supply switch 107 is connected to the control circuit 120, and supplies a signal related to a power-on operation or a power-off operation performed by the user to the control circuit 120. The PTT switch 108 is connected to the control circuit 120, and supplies a signal related to a PTT-on operation or a PTT-off operation performed by the user to the control circuit 120. The operation unit 109 is connected to the control circuit 120, and supplies signals related to various types of operations performed by the user to the control circuit 120.

The configuration of the radio communication apparatus 100 has been described above. Note that, in the radio communication apparatus 100 shown in FIG. 2, the volume adjustment unit 103, the power supply switch 107, the operation unit 109, and the display unit 110 are not indispensable components.

Figure 3:
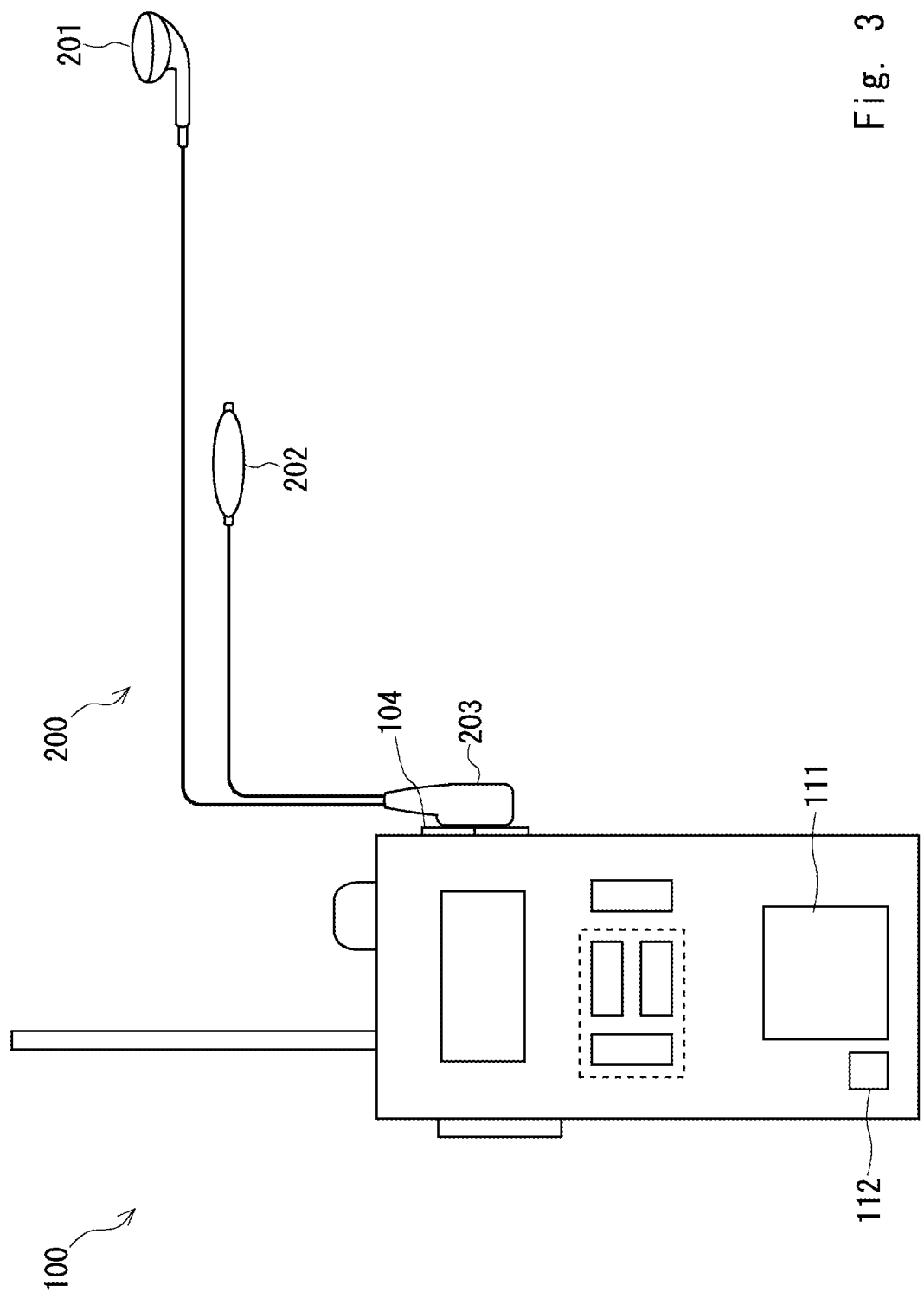
FIG. 3 is a schematic diagram showing a state in which the external speaker-microphone is connected to the radio communication apparatus.

Next, a state in which the radio communication apparatus 100 is connected to the external speaker-microphone 200 will be described with reference to FIGS. 3 and 4. FIG. 3 is a schematic diagram showing a state in which the radio communication apparatus 100 is connected to the external speaker-microphone 200.

As shown in FIG. 3, the external connection terminal 104 of the radio communication apparatus 100 is connected to the external terminal unit 203 of the external speaker-microphone 200. As a result, the radio communication apparatus 100 drives the external speaker 201 and the external microphone 202 included in the external speaker-microphone 200 instead of driving the internal speaker 111 and the internal microphone 112. By adopting the above-described configuration, the user can make a telephone call with an entity on the other end of the connection by using the external speaker-microphone 200, for example, without holding the radio communication apparatus 100, i.e., without taking out the radio communication apparatus 100 put in a pocket of user's clothes or the like.

Figure 4:
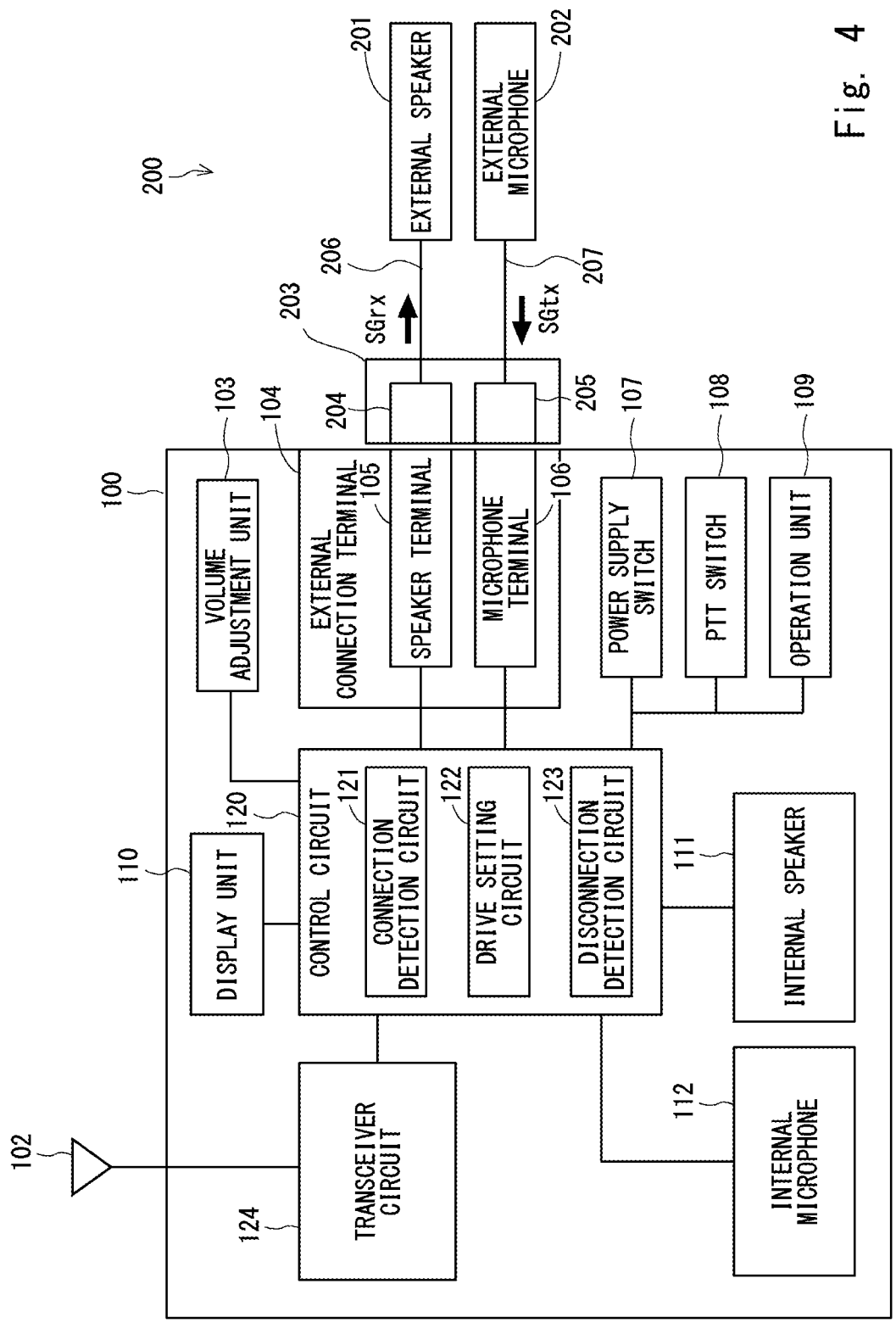
FIG. 4 is a block diagram for the state in which the external speaker-microphone is connected to the radio communication apparatus.

FIG. 4 is a block diagram showing a state in which the radio communication apparatus 100 is connected to the external speaker-microphone 200. The radio communication apparatus 100 shown in FIG. 4 is connected to the external speaker-microphone 200. In this case, the connection detection circuit 121 detects a connection with the external speaker-microphone 200. Therefore, the drive setting circuit 122 makes a setting so that the external speaker 201 and the external microphone 202 are driven. That is, the control circuit 120 supplies a reception audio signal SGrx received from the transceiver circuit 124 to the external speaker 201, and receives a transmission audio signal SGtx from the external microphone 202 when the PTT switch 108 is in an On-state.

Figure 5:
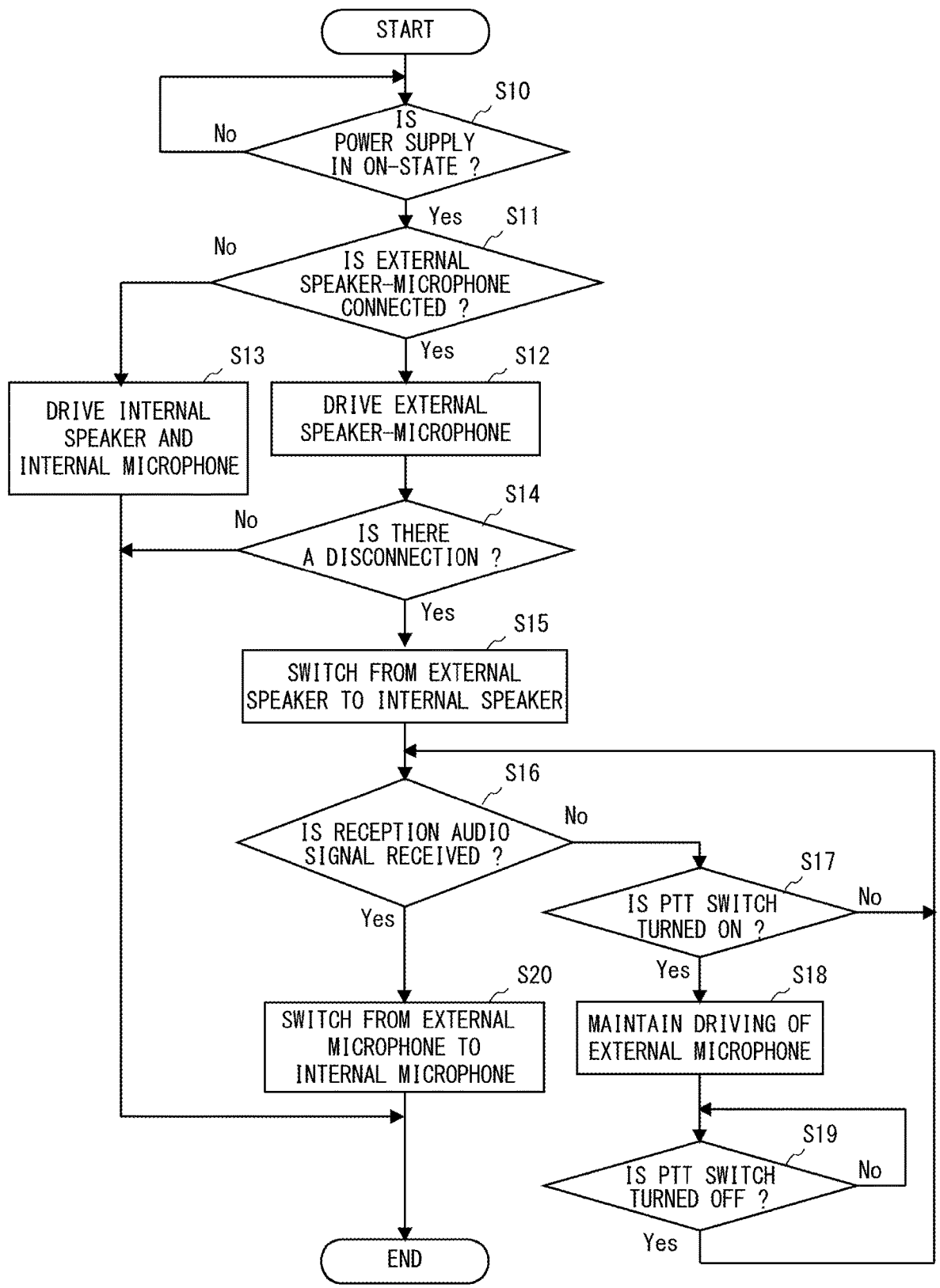
FIG. 5 is a flowchart showing processes performed by the radio communication apparatus according to the first embodiment.

Next, processes performed by the radio communication apparatus 100 will be described with reference to FIG. 5. FIG. 5 is a flowchart showing processes performed by the radio communication apparatus according to the first embodiment. The flowchart shown in FIG. 5 shows processes performed by the control circuit 120 when the radio communication apparatus 100 is started up. For example, a user who uses the radio communication apparatus 100 selects whether or not to connect the external speaker-microphone 200 to the radio communication apparatus 100 before starting up the radio communication apparatus 100. Then, after connecting the external speaker-microphone 200 to the radio communication apparatus 100, the user starts up the radio communication apparatus 100.

Alternatively, the user selects not to connect the external speaker-microphone 200 to the radio communication apparatus 100 before starting up the radio communication apparatus 100, and then starts up the radio communication apparatus 100.

Firstly, the control circuit 120 determines whether or not the power supply of the radio communication apparatus 100 is in an On-state (step S10). That is, the control circuit 120 monitors the state of the power supply switch 107 at predetermined intervals (e.g., at intervals of 500 milliseconds) when the power supply of the radio communication apparatus 100 is in an Off-state, and thereby determines whether or not the power supply of the radio communication apparatus 100 is in an On-state according to the state of the power supply switch 107. When it is not determined that the power supply is in the On-state (step S10: No), the control circuit 120 repeats the step S10. When it is determined that the power supply is in the On-state (step S10: Yes), the control circuit 120 proceeds to a step S11.

Next, the connection detection circuit 121 of the control circuit 120 determines whether or not the external speaker-microphone 200 is connected to the radio communication apparatus 100 (step S11). When the external speaker-microphone 200 is not connected to the radio communication apparatus 100, the connection detection circuit 121 does not determine that the external speaker-microphone 200 is connected to the radio communication apparatus 100. In this case (step S11: No), the control circuit 120 proceeds to a step S13. On the other hand, when the external speaker-microphone 200 is connected to the radio communication apparatus 100, the connection detection circuit 121 determines that the external speaker-microphone 200 is connected to the radio communication apparatus 100. In this case (step S11: Yes), the control circuit 120 proceeds to a step S12.

In the step S12, the control circuit 120 makes a setting so that the external speaker-microphone 200 is driven (step S12). Therefore, in this case, the radio communication apparatus 100 enters the state shown in FIG. 4. After the step S12, the control circuit 120 proceeds to a step S14.

In the step S13, the control circuit 120 makes a setting so that the internal speaker 111 and the internal microphone 112 are driven (step S13). Therefore, in this case, the radio communication apparatus 100 enters the state shown in FIG. 2. After the step S13, the control circuit 120 finishes the series of processes. Note that after finishing the series of processes shown in FIG. 5, the radio communication apparatus 100 performs communication by using the set speaker and the set microphone. That is, in this case, the radio communication apparatus 100 performs the communication by driving the internal speaker 111 and the internal microphone 112.

In the step S14, the disconnection detection circuit 123 of the control circuit 120 determines whether or not there is a disconnection (e.g., a broken wire or the like) in the audio signal line for or in the external speaker 201 of the connected external speaker-microphone 200 (step S14). When it is not determined that there is a disconnection in the audio signal line for or in the external speaker 201 (step S14: No), the control circuit 120 finishes the series of processes. In this case, the radio communication apparatus 100 performs communication by driving the external speaker 201 and the external microphone 202. On the other hand, when it is determined that there is a disconnection in the audio signal line for or in the external speaker 201 (step S14: Yes), the control circuit 120 proceeds to a step S15.

In the step S15, the drive setting circuit 122 of the control circuit 120 drives the internal speaker 201 instead of driving the external speaker 111. That is, the drive setting circuit 122 switches the speaker to be driven from the external speaker 201 to the internal speaker 111 (step S15). As a result, even when the external speaker-microphone 200 is connected to the radio communication apparatus 100, the radio communication apparatus 100 outputs a sound represented by the reception audio signal SGrx from the internal speaker 111.

Next, the drive setting circuit 122 of the control circuit 120 determines whether or not a reception audio signal SGrx is received (step S16). When it is not determined that a reception audio signal SGrx is received (step S16: No), the drive setting circuit 122 proceeds to a step S17.

On the other hand, when it is determined that a reception audio signal SGrx is received (step S16: Yes), the drive setting circuit 122 switches the microphone that generates a transmission audio signal SGtx from the external microphone 202 to the internal microphone 112 (step S20). That is, after receiving the reception audio signal SGrx, the drive setting circuit 122 drives the internal microphone 108 instead of driving the external microphone 202 when the user operates the PTT switch 112 into an On-state. Then, the control circuit 120 finishes the series of processes.

Figure 6:
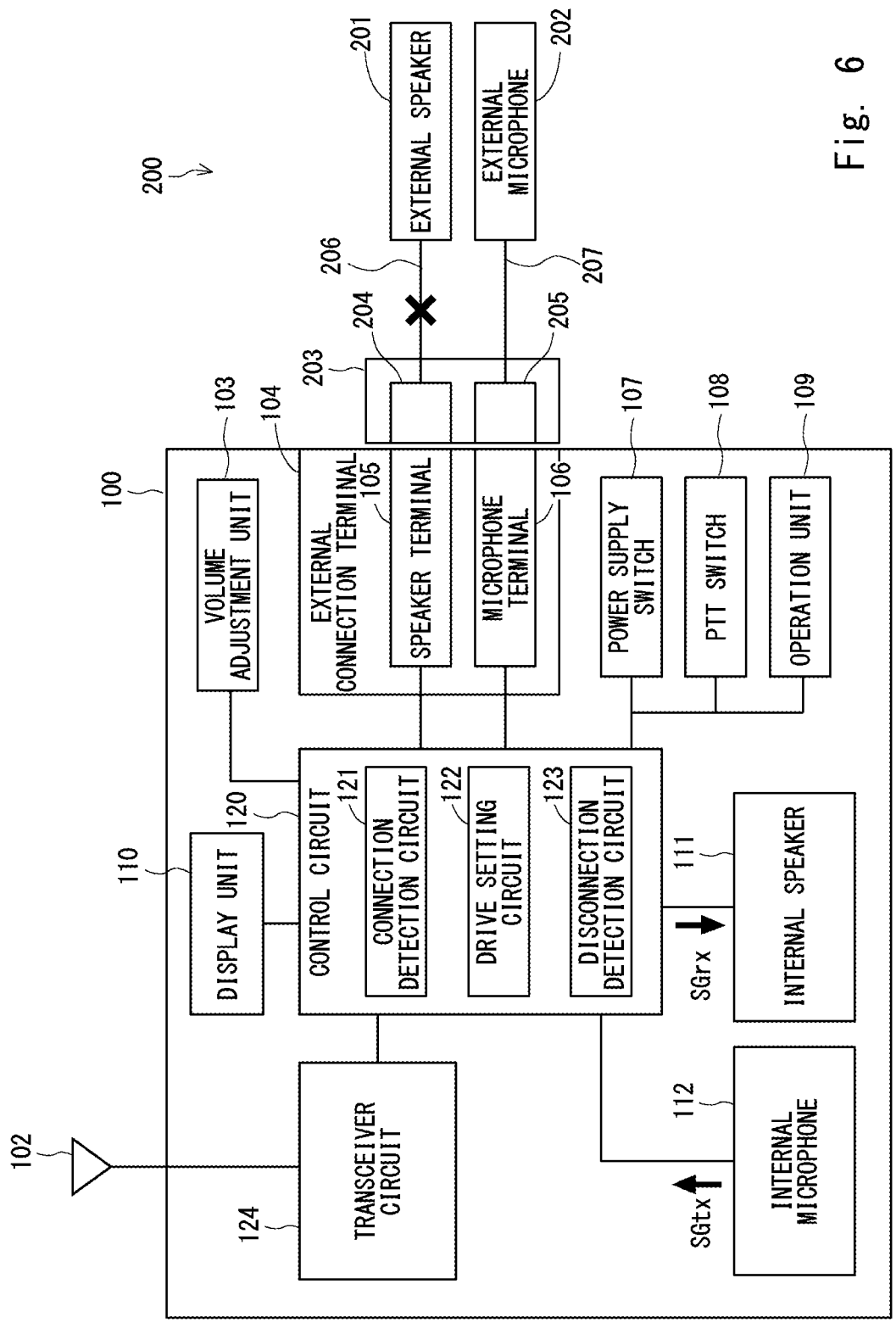
FIG. 6 is a first block diagram showing a state in which there is a disconnection in an audio signal line for or in an external speaker.

A state in the step S20 will be described with reference to FIG. 6. FIG. 6 is a first block diagram showing a state where there is a disconnection (e.g., a broken wire or the like) in the audio signal line for or in the external speaker. In the external speaker-microphone 200 shown in FIG. 6, the speaker cable 206 is broken. Therefore, a mark "x" is shown on the speaker cable 206. The radio communication apparatus 100 in the step S20 is receiving a reception audio signal SGrx from the entity on the other end of the communication. Therefore, the drive setting circuit 122 drives the internal speaker 111 and the internal microphone 112 instead of driving the external speaker 201 and the external microphone 202, respectively.

As described above, when there is a disconnection in the audio signal line for or in the external speaker 201 and a reception audio signal SGrx is received from the entity on the other end of the communication, the radio communication apparatus 100 drives the internal speaker 111 and the internal microphone 112 instead of driving the external speaker-microphone 200. The radio communication apparatus 100 maintains the communication by outputting a sound represented by the reception audio signal SGrx from the internal speaker 111. Further, the radio communication apparatus 100 notifies the user that there is a failure in the external speaker-microphone 200 by driving the internal speaker 111. Furthermore, in this case, the radio communication apparatus 100 minimizes the interruption of the communication performed by the user, who has recognized that there is the failure in the external speaker-microphone 200, by driving the internal microphone 112 instead of driving the external microphone 202.

The description will be continued with reference to FIG. 5. In a step S17, the drive setting circuit 122 determines whether or not the PTT switch 108 is in an On-state (step S17). When the PTT switch 108 is operated and hence it is not determined that the PTT switch 108 is in an On-state (step S17: No), the drive setting circuit 122 returns to the step S16.

On the other hand, when it is determined that the PTT switch 108 is in an On-state (step S17: Yes), the drive setting circuit 122 maintains the driving of the external microphone 202 (step S18). Then, the drive setting circuit 122 determines whether or not the PTT switch 108 is in an Off-state (step S19). When the PTT switch 108 is kept in the On-state, the drive setting circuit 122 does not determine that the PTT switch 108 is in an Off-state (step S19: No). In this case, the drive setting circuit 122 repeats the step S19. On the other hand, when the PTT switch 108 is operated and hence the On-state thereof is cancelled, the drive setting circuit 122 determines that it is in an Off-state (step S19: Yes). In this case, the drive setting circuit 122 returns to the step S16. As described above, when the PTT switch 108 is turned on after the disconnection detection circuit 123 detects a disconnection and before the transceiver circuit 124 receives a reception audio signal SGrx, the drive setting circuit 122 drives the external microphone 202.

Figure 7:
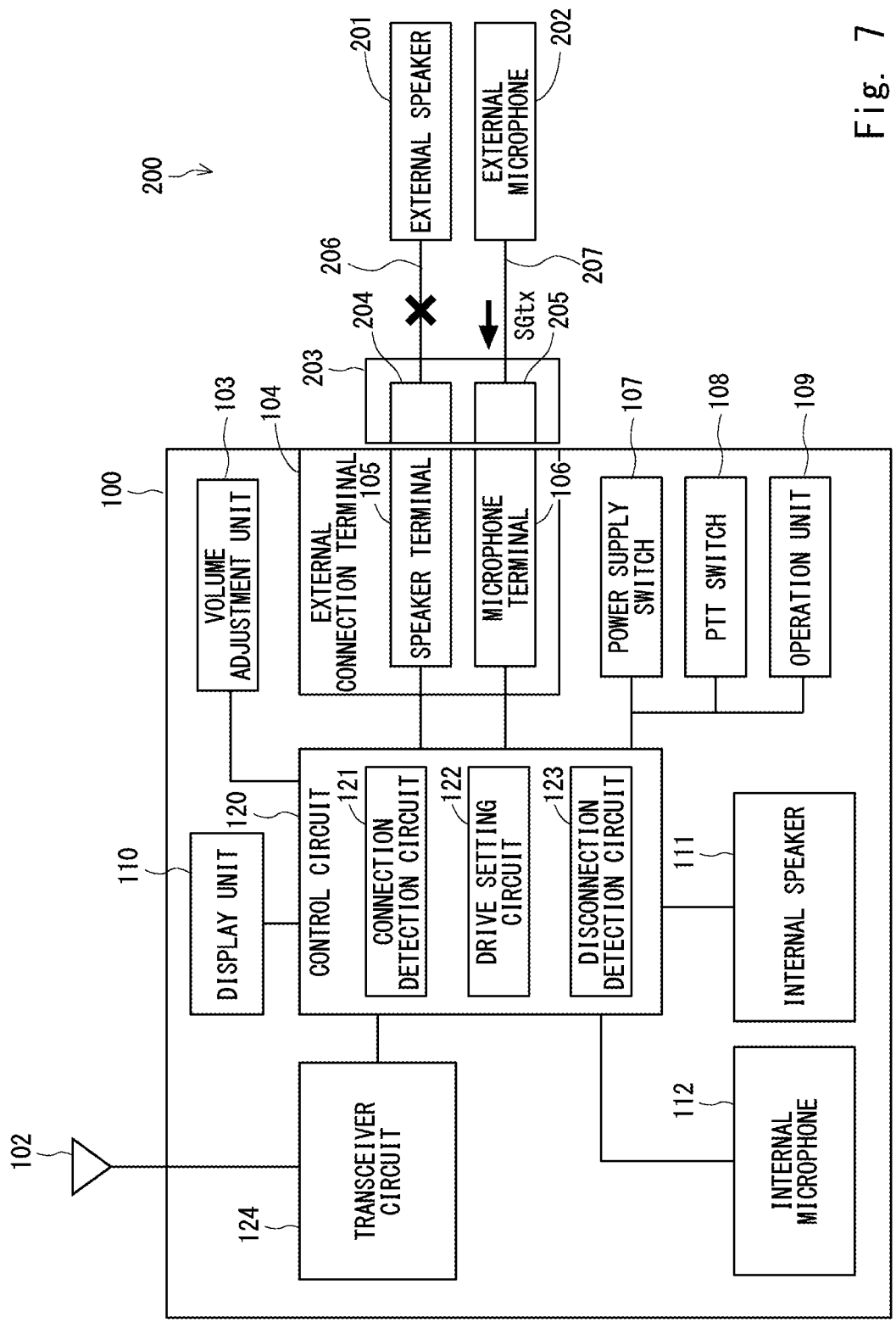
FIG. 7 is a second block diagram showing the state in which there is a disconnection in the audio signal line for or in the external speaker.

A state in the step S18 will be described with reference to FIG. 7. FIG. 7 is a second block diagram showing a state where there is a disconnection in the audio signal line for or in the external speaker. In the external speaker-microphone 200 shown in FIG. 7, the speaker cable 206 is broken. Therefore, a mark "x" is shown on the speaker cable 206. In the radio communication apparatus 100 in the step S19, the user presses down the PTT switch 108 and thereby turns on the PTT switch 108 before a reception audio signal SGrx is received from the entity on the other end of the communication. Therefore, the drive setting circuit 122 maintains the driving of the external microphone 202.

Even when there is a disconnection in the audio signal line for or in the external speaker 201 of the external speaker-microphone 200, the user does not recognize the disconnection in the audio signal line for or in the external speaker 201 before a reception audio signal SGrx is received from the entity on the other end of the communication. Therefore, the user presumes that he/she can use the external speaker and the external microphone. In such a case, in preparation for the case where the user desires to transmit a sound before a reception audio signal SGrx is received, the external microphone 202 should be in an enabled state. Therefore, even after the disconnection detection circuit 123 detects a disconnection, the radio communication apparatus 100 drives the external microphone 202 before it receives a reception audio signal SGrx.

When there is a disconnection in the audio signal line for or in the external speaker 201 of the external speaker-microphone 200 and a reception audio signal SGrx is received from the entity on the other end of the communication, the received sound is output from the internal speaker 111 even though the external speaker-microphone 200 is connected to the radio communication apparatus 100. Because of this, the user can recognize that the external speaker-microphone 200 cannot be used because some trouble has occurred therein. Therefore, when the transceiver circuit 124 receives a reception audio signal SGrx after the disconnection detection circuit 123 detects a disconnection in the audio signal line for or in the external speaker 201 and before the PTT switch 108 is turned on, the drive setting circuit 122 drives the internal microphone 112.

The first embodiment has been described above. The configuration of the radio communication apparatus 100 according to the first embodiment is not limited to the above-described configuration. For example, when there is a disconnection in the audio signal line for or in the external speaker 201, the radio communication apparatus 100 may continue to drive the external microphone 202 after it receives a reception audio signal SGrx.

As described above, according to the radio communication apparatus 100 in accordance with the first embodiment, it is possible to provide a radio communication apparatus and the like capable of suitably continuing voice communication even when there is a disconnection in an audio signal line for or in a connected external speaker.

Second Embodiment

Next, a second embodiment will be described. The second embodiment is different from the first embodiment because the external speaker-microphone includes an external PTT switch and the radio communication apparatus is configured to receive an operation performed on the external PTT switch.

Figure 8:
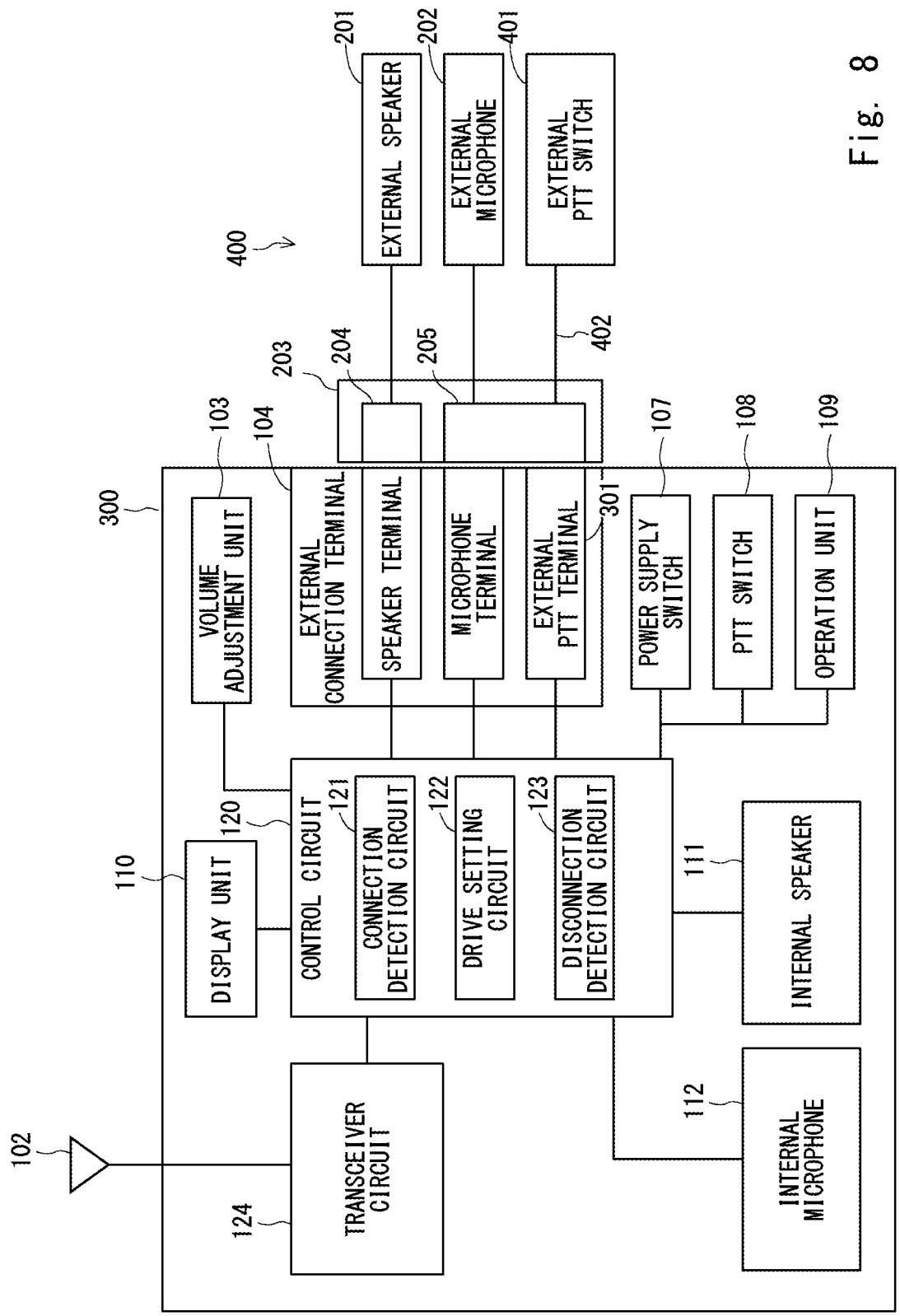
FIG. 8 is a block diagram of a radio communication apparatus and an external speaker-microphone according to a second embodiment.

FIG. 8 is a block diagram of a radio communication apparatus 300 and an external speaker-microphone 400 according to a second embodiment. FIG. 8 shows a state in which the radio communication apparatus 300 is connected to the external speaker-microphone 400. The radio communication apparatus 300 includes an external PTT terminal 301 in the external connection terminal 104. The external PTT terminal 301 is connected to an external PTT switch 401 provided in the external speaker-microphone 400, and supplies a signal related to the operation state of the external PTT switch 401 to the control circuit 120.

The external speaker-microphone 400 includes the external PTT switch 401 in addition to the external speaker 201 and the external microphone 202. The external PTT switch 401 is connected to the control circuit 120 through an external PTT cable 402, the microphone plug 205, and the external PTT terminal 301, and supplies a signal related to a PTT-on operation or a PTT-off operation performed by a user to the control circuit 120.

The drive setting circuit 122 of the radio communication apparatus 300 monitors the states of the PTT switch 108 and the external PTT switch 401, respectively. The drive setting circuit 122 drives the internal microphone 112 or the external microphone 202 according to the connection state of the external speaker-microphone 400 detected by the connection detection circuit 121 and the disconnection state detected by the disconnection detection circuit 123.

For example, when the external speaker-microphone 400 is connected to the radio communication apparatus 300 and there is no disconnection in the audio signal line for or in the external speaker 201, the drive setting circuit 122 drives the external microphone 202 as the microphone that generates a transmission audio signal SGtx. In this case, the drive setting circuit 122 drives the external microphone 202 when the PTT switch 108 is turned on or when the external PTT switch 401 is turned on.

Further, when the PTT switch 108 is turned on after the disconnection detection circuit 123 detects a disconnection, the drive setting circuit 122 drives the internal microphone 112. Further, when the external PTT switch 401 is turned on after the disconnection detection circuit 123 detects a disconnection, the drive setting circuit 122 drives the external microphone 202.

Figure 9:
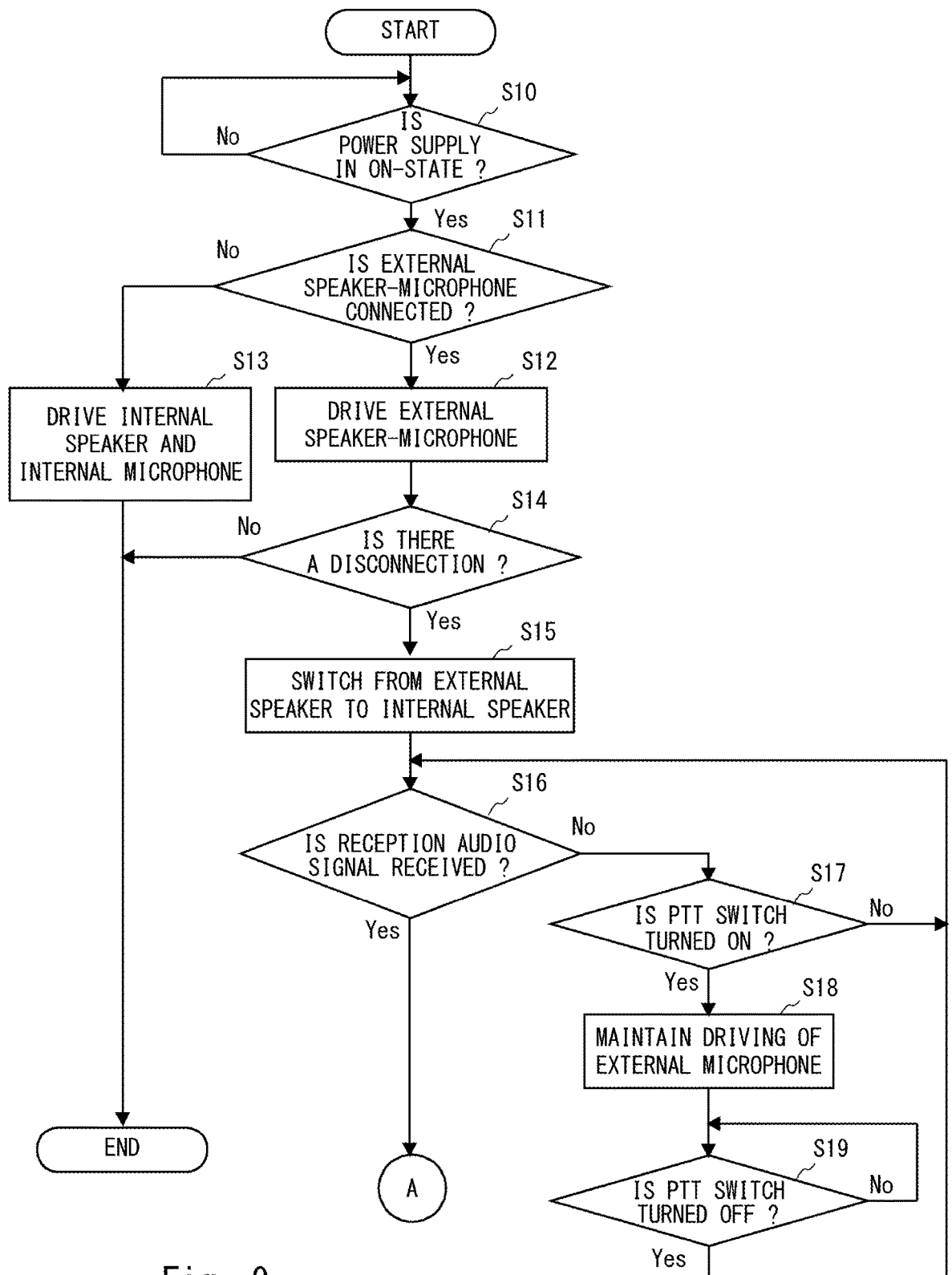
FIG. 9 is a flowchart showing processes performed by the radio communication apparatus according to the second embodiment.
Figure 10:
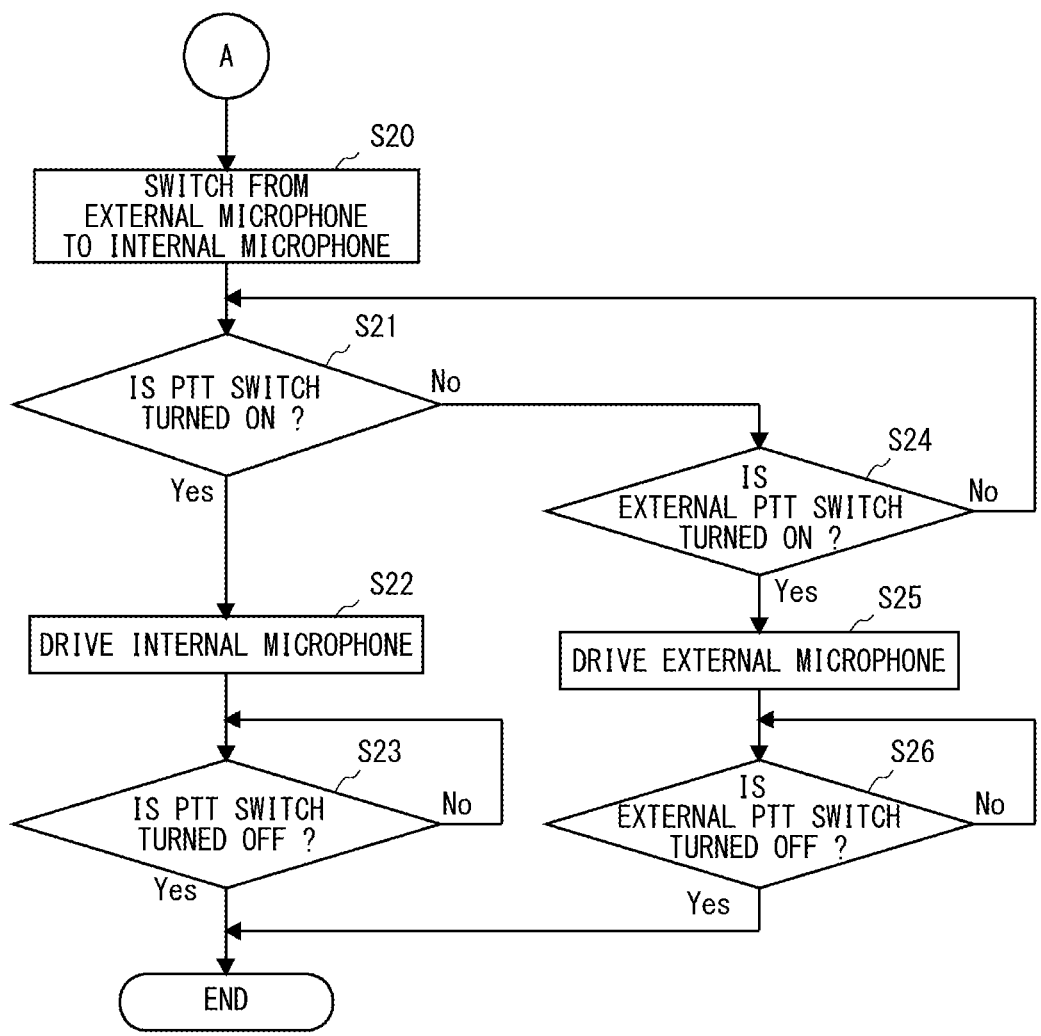
FIG. 10 is a flowchart showing processes performed by the radio communication apparatus according to the second embodiment.

Processes performed by the radio communication apparatus 300 will be described with reference to FIGS. 9 and 10. FIGS. 9 and 10 show a flowchart showing processes performed by the radio communication apparatus according to the second embodiment. The flowchart shown in FIGS. 9 and 10 shows processed performed by the control circuit 120 when the radio communication apparatus 300 is started up. In the flowchart shown in FIG. 9 and FIG. 10, processes from a step S10 to a step S19 are similar to those in the flowchart in the first embodiment shown in FIG. 5, whereas processes performed after the step S19 (processes shown in FIG. 10) are different from those in the flowchart in the first embodiment. The processes different from those in the flowchart in the first embodiment will be described hereinafter.

In a step S16, when it is determined that a reception audio signal SGrx is received (step S16: Yes), the drive setting circuit 122 switches the microphone that generates a transmission audio signal SGtx from the external microphone 202 to the internal microphone 112 (step S20). That is, after the reception audio signal SGrx is received, the drive setting circuit 122 drives the internal microphone 112 instead of driving the external microphone 202 when the user operates the PTT switch 108 into an On-state. Then, the control circuit 120 proceeds to a step S21.

In the step S21, the control circuit 120 determines whether or not the PTT switch 108 is in an On-state (step S21). When it is determined that the PTT switch 108 is in the On-state (step S21: Yes), the drive setting circuit 122 drives the internal microphone 112 (step S22). Next, the control circuit 120 proceeds to a step S23.

In the step S23, the control circuit 120 determines whether or not the PTT switch 108 is in an Off-state (step S23). When it is not determined that the PTT switch 108 is in the Off-state (step S23: No), the drive setting circuit 122 repeats the step S23. When it is determined that the PTT switch 108 is in the Off-state (step S23: Yes), the drive setting circuit 122 finishes the series of processes.

In the step S21, when it is not determined that the PTT switch 108 is in the On-state (step S21: No), the drive setting circuit 122 determines whether or not the external PTT switch 401 is in an On-state (step S24). When it is not determined that the external PTT switch 401 is in the On-state (step S24: No), the drive setting circuit 122 returns to the step S21 again. On the other hand, when it is determined that the external PTT switch 401 is in the On-state (step S24: Yes), the drive setting circuit 122 drives the external microphone 202 (step S25). Then, the drive setting circuit 122 proceeds to a step S26.

In the step S26, the control circuit 120 determines whether or not the external PTT switch 401 is in an off state (step S26). When it is not determined that the external PTT switch 401 is in the Off-state (step S26: No), the drive setting circuit 122 repeats the step S26. When it is determined that the external PTT switch 401 is in the Off-state (step S26: Yes), the drive setting circuit 122 finishes the series of processes.

The flowchart in the second embodiment has been described above. Note that, in the above-described flowchart, the order of the steps S21 and S23 may be reversed, or they may be performed in parallel to each other.

By the above-described configuration, the radio communication apparatus 300 according to the second embodiment drives the external microphone 202 when the user desires to use the external microphone 202 even when there is a disconnection in the connected external speaker 201. As a result, the radio communication apparatus 300 can maintain the voice communication in a state corresponding to a state desired by the user. As described above, according to the second embodiment, it is possible to provide a radio communication apparatus and the like capable of suitably continuing voice communication even when there is a disconnection in an audio signal line for or in a connected external speaker.

Note that the above-described program can be stored in various types of non-transitory computer readable media and thereby supplied to the computer. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to the computer by using various types of transitory computer readable media. Examples of the transitory computer readable media include an electrical signal, an optical signal, and an electromagnetic wave. The transitory computer readable media can be used to supply programs to the computer through a wire communication path such as an electrical wire and an optical fiber, or wireless communication path.

Note that the present disclosure is not limited to the above-described example embodiments and can be modified as appropriate without departing from the spirit and scope of the present disclosure.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A radio communication apparatus comprising:
    a transceiver circuit configured to transmit a transmission audio signal and receive a reception audio signal in radio communication;
    an internal speaker;
    an internal microphone;
    a Push-to-Talk (PTT) switch configured to bring the transceiver circuit into a transmitting state when the PTT switch is in an On-state, and bring the transceiver circuit into a receiving state when the PTT switch in an Off-state;
    an external connection terminal configured so that an external speaker-microphone comprising an external speaker and an external microphone is connected thereto and can be driven therethrough;
    a connection detection circuit configured to detect a connection between the external speaker-microphone and the external connection terminal;
    a drive setting circuit configured to drive the internal speaker and the internal microphone when the connection detection circuit does not detect a connection, and drive the external speaker-microphone instead of driving the internal speaker and the internal microphone when the connection detection circuit detects the connection; and
    a disconnection detection circuit configured to detect a disconnection in an audio signal line for or in the external speaker included in the connected external speaker-microphone,
    wherein, when the disconnection detection circuit detects the disconnection, the drive setting circuit makes a setting so that a sound represented by a reception audio signal is output from the internal speaker instead of being output from the external speaker, and
    wherein, when the transceiver circuit receives the reception audio signal after the disconnection detection circuit detects the disconnection and before the PTT switch is turned on, the drive setting circuit sets the internal microphone so that the internal microphone can be driven.

2. The radio communication apparatus according to claim 1,
    wherein, when the PTT switch is turned on after the disconnection detection circuit detects the disconnection and before the transceiver circuit receives the reception audio signal, the drive setting circuit drives the external microphone.

3. A control method performed by a radio communication apparatus,
    the radio communication apparatus comprising an internal speaker, an internal microphone, a Push-to-Talk (PTT) switch, and an external connection terminal configured so that an external speaker-microphone comprising an external speaker and an external microphone is connected thereto and is configured to be driven therethrough,
    the control method comprising:
        detecting a connection between the external speaker-microphone and the external connection terminal;
        when the connection is detected, driving the external speaker-microphone instead of driving the internal speaker and the internal microphone;
        detecting a disconnection in an audio signal line for or in the external speaker included in the connected external speaker-microphone;
        when the disconnection is detected, making a setting so that a sound represented by a reception audio signal is output from the internal speaker instead of being output from the external speaker; and
        driving the external microphone when the PTT switch is turned on after the detection of the disconnection detects the disconnection and before the radio communication apparatus receives the reception audio signal.

4. A non-transitory computer readable medium storing a control program for a radio communication apparatus,
    the radio communication apparatus comprising an internal speaker, an internal microphone, a Push-to-Talk (PTT) switch, and an external connection terminal configured so that an external speaker-microphone comprising an external speaker and an external microphone is connected thereto and is configured to be driven therethrough,
    the control program being adapted to cause the radio communication apparatus to perform:
        detecting a connection between the external speaker-microphone and the external connection terminal;
        when the connection is detected, driving the external speaker-microphone instead of driving the internal speaker and the internal microphone;
        detecting a disconnection in an audio signal line for or in the external speaker included in the connected external speaker-microphone;
        when the disconnection is detected, making a setting so that a sound represented by a reception audio signal is output from the internal speaker instead of being output from the external speaker; and
        when the external speaker-microphone comprises an external PTT switch configured to bring the transceiver circuit to a transmitting state when the external speaker-microphone is an On-state, and bring the transceiver circuit to a receiving state when the external speaker-microphone is in an Off-state, driving the internal microphone when the PTT switch is turned on after the disconnection detection circuit detects the disconnection, and driving the external microphone when the external PTT switch is turned on after the disconnection detection circuit detects the disconnection.

* * * * *